(12) United States Patent
Crider et al.

(10) Patent No.: US 11,814,230 B2
(45) Date of Patent: Nov. 14, 2023

(54) FREE-STANDING BLISTER PACK

(71) Applicant: AKI, Inc., Chattanooga, TN (US)

(72) Inventors: Matthew Crider, Freehold, NY (US);
Sara Ann Isola, Rutherford, NJ (US);
Savy Mina An, Bound Brook, NJ (US);
Christopher Wemett, Berkeley Heights, NJ (US); Jeanine Rivera, New York, NY (US)

(73) Assignee: AKI, Inc., Chattanooga, TN (US)

( * ) Notice: Subject to any disclaimer, the term of this patent is extended or adjusted under 35 U.S.C. 154(b) by 95 days.

(21) Appl. No.: 17/232,373

(22) Filed: Apr. 16, 2021

(65) Prior Publication Data
US 2021/0323743 A1    Oct. 21, 2021

Related U.S. Application Data

(60) Provisional application No. 63/010,730, filed on Apr. 16, 2020.

(51) Int. Cl.
| | |
|---|---|
| *B65D 75/36* | (2006.01) |
| *B65D 75/52* | (2006.01) |
| *B65D 75/58* | (2006.01) |
| *B65B 5/02* | (2006.01) |
| *B29D 22/00* | (2006.01) |
| *B65B 61/00* | (2006.01) |
| *B65B 5/04* | (2006.01) |
| *B65B 47/02* | (2006.01) |
| *B65B 61/02* | (2006.01) |

(52) U.S. Cl.
CPC ......... *B65D 75/367* (2013.01); *B29D 22/003* (2013.01); *B65B 5/02* (2013.01); *B65B 5/04* (2013.01); *B65B 47/02* (2013.01); *B65B 61/005* (2013.01); *B65B 61/02* (2013.01); *B65D 75/527* (2013.01); *B65D 75/5805* (2013.01)

(58) Field of Classification Search
CPC  B65D 75/367; B65D 75/527; B65D 75/5805; B65D 75/32; B65D 75/5811
USPC ............... 206/229, 581, 823, 736–774, 484; 40/124.19; 215/47, 253
See application file for complete search history.

(56) References Cited

U.S. PATENT DOCUMENTS

| | | | | |
|---|---|---|---|---|
| 959,655 | A * | 5/1910 | Tuck ......................... | A63H 3/52 446/87 |
| 2,828,565 | A * | 4/1958 | Goidstein .................. | G09F 1/00 206/45.24 |

(Continued)

FOREIGN PATENT DOCUMENTS

JP    2018002272 B2    1/2018

OTHER PUBLICATIONS

Written Opinion and International Search Report, International Searching Authority, dated Jul. 14, 2021.

*Primary Examiner* — Chun Hoi Cheung
(74) *Attorney, Agent, or Firm* — Rivkin Radler LLP

(57) ABSTRACT

A free-standing blister pack made by heating molding plastic material, film or sheet, creating a container portion of a fixed space, storing a product such as cosmetic, fragrance, or homecare products in the space, and having a cover sheet attached to a flange of the container portion so as to create a sealing function. The blister packaging has a support structure to hold the blister upright after the removal of the perforation and score feature allowing the product to remain in a free-standing position after assembly.

6 Claims, 3 Drawing Sheets

(56) References Cited

U.S. PATENT DOCUMENTS

| | | | |
|---|---|---|---|
| 3,093,244 A | 6/1963 | Middleton, Jr. | |
| 3,127,010 A | 3/1964 | Capezzuto | |
| 3,253,708 A * | 5/1966 | Stoker, Jr. | B65D 75/305 |
| | | | 206/484 |
| 3,407,928 A * | 10/1968 | Watts, Jr. | B65D 75/26 |
| | | | 206/463 |
| 3,685,649 A * | 8/1972 | Diehl | B65D 73/0092 |
| | | | 206/463 |
| 3,913,734 A | 10/1975 | Siegel | |
| 3,924,745 A * | 12/1975 | Hannemann | B65D 75/322 |
| | | | 222/541.9 |
| 4,155,454 A | 5/1979 | Ryden | |
| 4,784,268 A | 11/1988 | Perchak | |
| 4,930,627 A | 6/1990 | Borst | |
| 4,962,849 A | 10/1990 | Anderson | |
| 5,011,006 A | 4/1991 | Anderson | |
| 5,088,603 A * | 2/1992 | Kirkpatrick | B65D 75/58 |
| | | | 206/532 |
| 5,147,035 A | 9/1992 | Hartman | |
| 5,535,885 A * | 7/1996 | Daniel | A45D 40/0087 |
| | | | 383/107 |
| 5,775,511 A | 7/1998 | Stark | |
| 5,839,609 A * | 11/1998 | Zakensberg | B65D 75/32 |
| | | | 206/820 |
| 5,846,488 A | 12/1998 | Richardson | |
| 6,557,278 B1 * | 5/2003 | Huang | B65D 73/00 |
| | | | 40/124.19 |
| 7,624,859 B1 | 12/2009 | Casanova | |
| 8,061,563 B1 * | 11/2011 | Rosen | B65D 75/5805 |
| | | | 222/107 |
| 8,739,973 B2 | 6/2014 | Greenland | |
| 8,900,385 B2 | 12/2014 | Gough | |
| 8,910,834 B2 | 12/2014 | Becker | |
| 10,577,182 B2 | 3/2020 | Bartoli | |
| 2002/0157983 A1 * | 10/2002 | Krupka | A45D 40/0087 |
| | | | 206/466 |
| 2007/0228073 A1 | 10/2007 | Mazzarino | |
| 2008/0283435 A1 * | 11/2008 | Morgan | B65D 73/0092 |
| | | | 206/484 |
| 2012/0148967 A1 | 6/2012 | Thomas | |
| 2014/0262904 A1 * | 9/2014 | Young | B65D 75/28 |
| | | | 206/524.2 |
| 2019/0144187 A1 | 5/2019 | Hartman | |

* cited by examiner

FREE-STANDING BLISTER PACK

CROSS REFERENCE TO RELATED APPLICATIONS

This application claims priority to U.S. Provisional Application Ser. No. 63/010,730, filed Apr. 16, 2020, the contents of which are incorporated herein by reference in its entirety.

FIELD OF THE APPLICATION

The disclosed subject matter generally relates to a free-standing blister pack, and more particularly to a free-standing sampler for home care and other fragrance products.

DESCRIPTION OF THE RELATED ART

Blister packs are commonly used to package a wide variety of consumer goods from batteries to cosmetics to pharmaceuticals and many others. Blister packs offer many benefits. For example, transparent blister packs allow consumers to view the enclosed product before or after purchase while providing secure packaging for the goods. For the manufacturer, blister packs are relatively easy to produce.

Home fragrance is a delightful, popular, and growing field. Home fragrance allows consumers to customize their home with whichever fragrance they would like. It would therefore be desirable for a pack that allows home fragrance users to easily transport the fragrance product to any room, even after opening, while maintaining an aesthetically pleasing, decorative appearance.

Some known blister packs are designed to stand upright. These standing blister packs allow retailers to prominently display the enclosed products without opening the pack. An example of a standing blister pack is U.S. Pat. App. Pub. No. US20080283435 to Morgan, which is formed by horizontally folding the bottom portion of the pack to create a supporting base.

While there are known blister packs capable of standing in an upright position, there remains a need for a free-standing blister pack that is easily transportable while diffusing a contained fragrance.

SUMMARY

The purpose and advantages of the disclosed subject matter are set forth in the following description, and additional advantages may be obtained by the practice and knowledge of those skilled in the art based on this description.

The disclosed subject matter provides, according to some embodiments, a new free-standing blister pack for sampling a fragrance product. In some embodiments, the free-standing blister pack comprises a fragrance blister cavity and a diffuser rod blister cavity having snappable sealed openings that allow a user to access the contained fragrance and diffuser rods. The flange area around the diffuser rod blister cavity is detachably removable from the main fragrance blister cavity area, and one or both areas have precut slots that can be interlocked to form a support base for the free-standing blister pack, thereby allowing a user to move the fragrance sampler easily and conveniently from location to location.

Other embodiments of the disclosed subject matter include a method of manufacturing the free-standing blister pack comprising molding sheet material into a fragrance blister cavity and diffuser blister cavity, depositing the fragrance product inside the fragrance blister cavity and diffuser rods into the diffuser blister cavity, applying and fusing a cover layer to enclose the cavities, perforating the blister pack to form a main panel containing the fragrance blister cavity and a detachably removable support panel containing the diffuser blister cavity, cutting the outer perimeter of the blister pack, including slots in one or both panels, such that the main and support panel can interlock when detached and form a support base for the free-standing blister pack.

The foregoing summary and the following detailed description are exemplary and are intended to provide an explanation of the disclosed subject matter, which is further illustrated and explained by the accompanying drawings.

DETAILED DESCRIPTION

The free-standing blister pack presented herein allows a user to sample a fragrance product and easily and conveniently move the sample from location to location. The disclosed subject matter is particularly suited for use with fragrances such as essential oils, aromatherapy oils, and other home care fragrances.

In accordance with the disclosed subject matter, as embodied and broadly described herein, the free-standing blister pack comprises a fragrance blister cavity and a diffuser rod blister cavity with snappable sealed openings for accessing the fragrance and diffuser rods. The section of the blister pack around the diffuser rod blister cavity is detachably removable from the main fragrance blister cavity section, and one or both sections have precut slots that can be interlocked to form a support base for the free-standing blister pack.

Reference will now be made in detail to the various exemplary embodiments of the disclosed subject matter, which are illustrated in the accompanying drawings. The structure and corresponding methods of operation of the disclosed subject matter will be described in conjunction with this detailed description.

Figure 2:
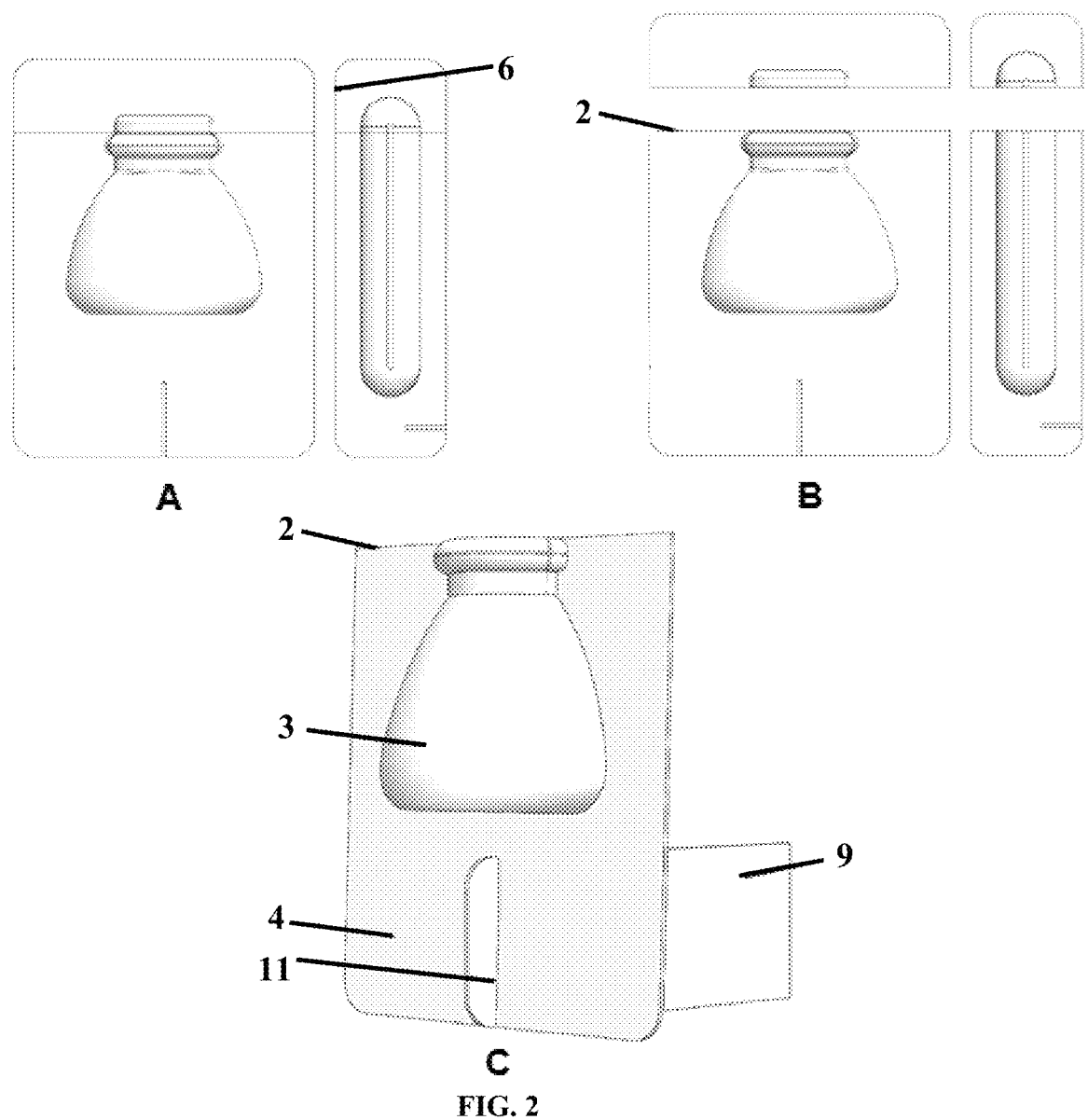
FIG. 2 shows exemplary stages of assembling the free-standing blister pack in accordance with the disclosed subject matter.
Figure 3:
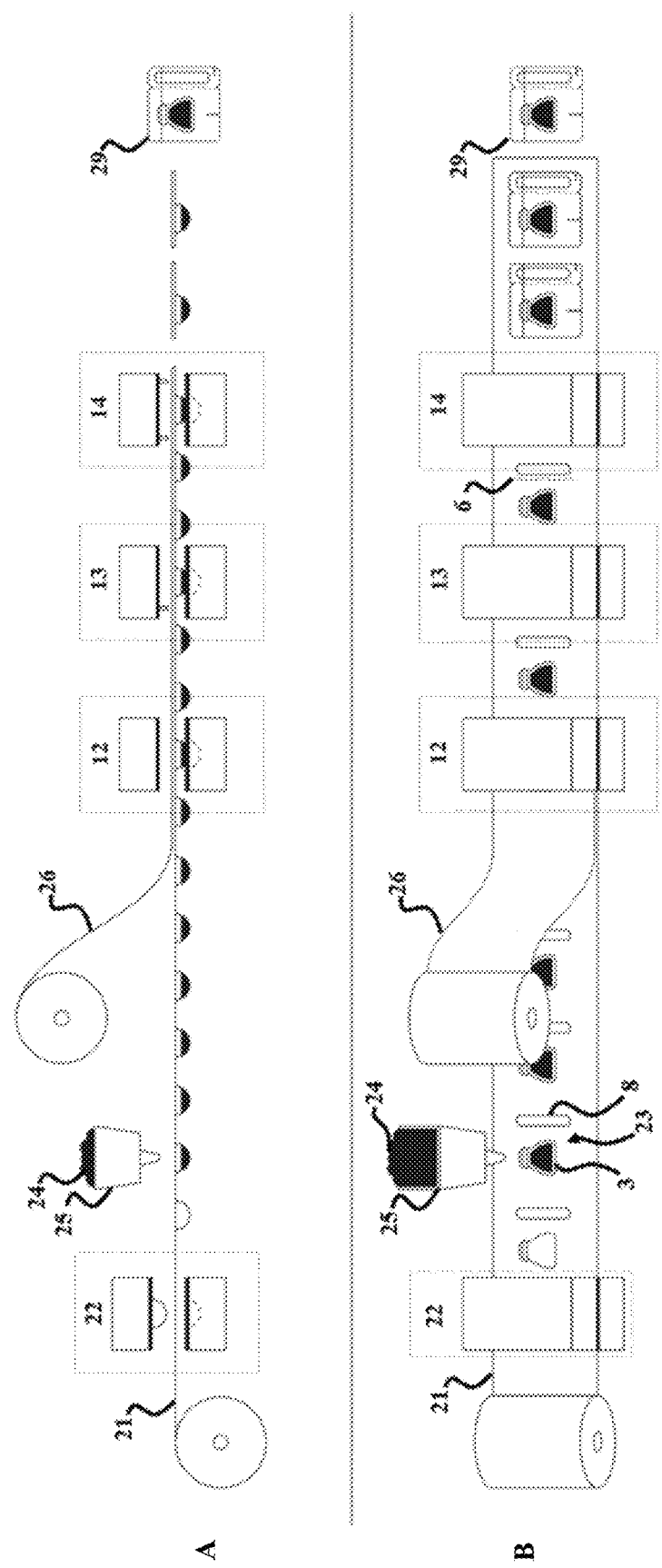
FIG. 3 shows a side view (A) and a top view (B) of an exemplary manufacturing process of the free-standing blister pack in accordance with the disclosed subject matter.

The accompanying figures, where like reference numerals refer to identical or functionally similar elements throughout the separate views, serve to further illustrate various embodiments and explain various principles and advantages all in accordance with the disclosed subject matter. For purpose of explanation and illustration, and not limitation, exemplary embodiments of the free-standing blister pack in accordance with the disclosed subject matter are shown in FIGS. 1-3.

Figure 1:
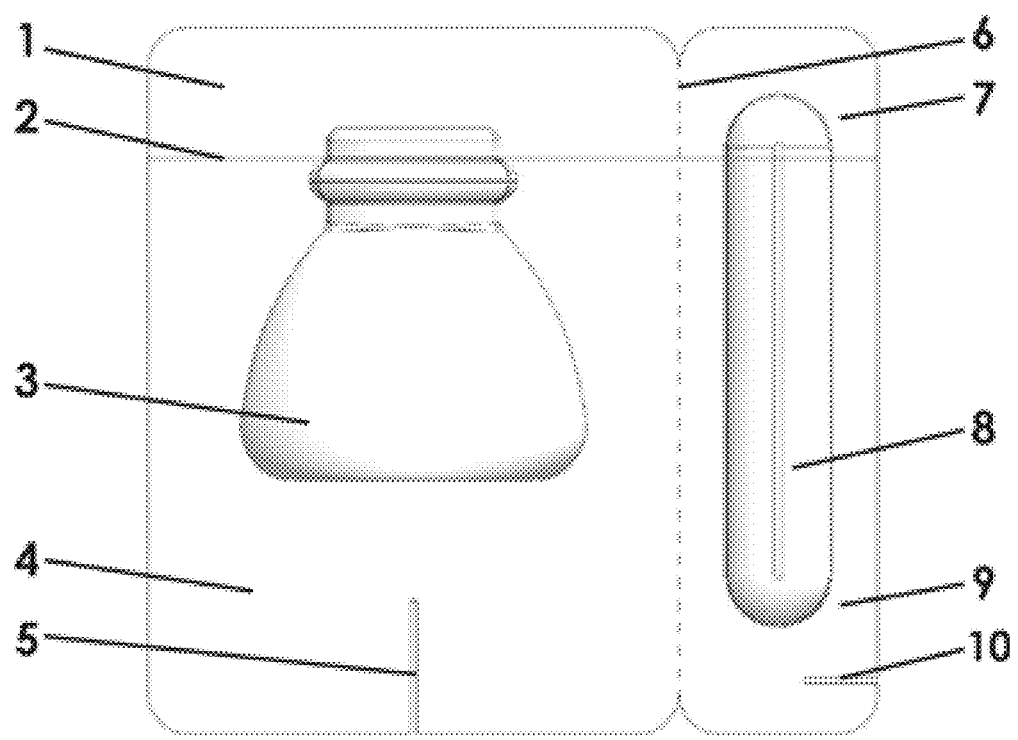
FIG. 1 is a view of an exemplary free-standing blister pack prior to assembly in accordance with the disclosed subject matter.

For purpose of illustration, and not limitation, reference is now made to FIG. 1, which shows an embodiment of the free-standing blister pack. In this embodiment, the free-standing blister pack has not yet been assembled into a free-standing mode. This embodiment is, for example, how a consumer could purchase the pack (and its enclosed product) from a retailer.

As shown in FIG. 1, the free-standing blister pack in this embodiment is substantially square in shape, although other suitable shapes such as rectangle, oval, and the like can be used in accordance with the disclosed subject matter. In this embodiment, the free-standing blister pack has two blister cavities, a fragrance cavity 3 and a diffuser cavity 8, both surrounded by substantially planar flange areas constituting the remainder of the blister pack shape. One cavity or several cavities can be used in accordance with the disclosed subject matter. In embodiments, fragrance cavity 3 is loaded with a volatile or cosmetic product (e.g., fragrance/perfume, essential oils, aromatherapy oils, foundation, and the like), and diffuser cavity 8 is loaded with at least one diffuser rod or applicator. In embodiments, the user may employ the diffuser rods to aid in the diffusion of the fragrance. (The term "fragrance" is used throughout this application to refer to any such volatile, cosmetic, homecare products, and the like.)

In this embodiment, the free-standing blister pack is divided into two lateral panels comprising four quadrant-like sections, the upper-left section 1, the lower-left section 4, the upper-right section 7, and the lower-right section 9. As shown in FIG. 1, the sections 1, 4, 7, and 9 are created by precut line 2 and perforation 6. In embodiments, perforation 6 extends vertically across the free-standing blister pack and between both cavities 3, 8, and precut line 2 extends horizontally across the free-standing blister pack and across both cavities 3, 8. Precut line 2 creates snap openings (e.g., by scoring) near the top portions of both cavities 3, 8.

Lower-left section 4 further comprises a receiving slot 5 extending substantially vertically from the bottom edge of section 4 toward and terminating before fragrance cavity 3. Likewise, lower-right section 9 further comprises an inserting slot 10 extending substantially horizontally from a lateral (in this embodiment, the right) edge of section 9 toward and terminating before the opposing lateral (in this embodiment, the left) edge of section 9.

In the FIG. 1 embodiment, both slots 5, 10 are configured such that lower sections 4, 9 can be connected by interlocking slots 5 and 10, during assembly of the free-standing blister pack. For example, in embodiments, the sum of the lengths of both slots 5, 10 is approximately equal to the width of the lower-right section 9 (e.g., the length of both slots 5, 10 is approximately half the width of the lower-right section 9), such that when the lower sections 4, 9 are connected by interlocking the slots 5, 10, the bottom (i.e., closest to the supported surface) edges of the lower sections 4, 9 are both flush with the supporting surface (e.g., table), as shown in FIG. 2(c).

In some embodiments, only one section (preferably lower-left section 4) has a slot. The lower-left section 4 can have a plurality of slots to receive a plurality of detachable sections. Other arrangements for interlocking or attaching the detachable sections will be apparent to those of skill in the art without departing from the scope of the disclosed subject matter.

An exemplary assembly process of the free-standing blister pack (specifically the embodiment of FIG. 1) will be described with reference to FIG. 2, starting with FIG. 2(a). In operation, when ready to assemble the free-standing blister pack, a user separates left sections 1, 4 from right sections 7, 9 along the perforation 6 (e.g., by bending the blister pack along perforation 6). This detaches left sections 1, 4 from right sections 7, 9, thereby separating cavities 3, 8 and their respective blister-pack sections. An exemplary result of this process is illustrated in FIG. 2(a), which shows the blister pack divided horizontally along perforation 6.

Turning now to the embodiment shown in FIG. 2(b), in operation, when ready to use the contents of cavities 3, 8, the user snaps open cavities 3, 8 along the precut line 2 (e.g., bending the blister pack along precut line 2). This detaches upper sections 1, 7 from lower sections 4, 9, thereby giving the user access to both cavities 3, 8 and their contents. An exemplary result of this process is illustrated in FIG. 2(b), which shows the blister pack divided vertically along precut line 2. FIG. 2(b) shows upper-left section 1 and upper-right section 7 further separated from each other having been separated in this embodiment in the process shown in FIG. 2(a), but in other embodiments the process shown in FIG. 2(b) can be performed first, thereby leaving the two upper sections attached to each other, to be optionally separated later.

As shown in FIG. 2(c), after lower-right section 9 has been detached from the blister pack (whether as shown in FIG. 2(a) or otherwise, and either together with upper-right section 7 or separately), the free-standing blister is assembled by joining slots 5, 10 together to form a base structure 11. In this embodiment, as shown in FIG. 2(c), base structure 11 is substantially T-shaped, however other arrangements will be apparent to those skilled in the art in accordance with the disclosed subject matter (including the alternative slot arrangements discussed above).

According to this exemplary assembly process, FIG. 2(a) shows upper-left section 1 and upper-right section 7 still attached to their respective lower sections 4, 9 and thus both cavities 3, 8 remain sealed. This may be preferable, particularly where fragrance cavity 3 contains a volatile liquid that could spill during assembly. In such cases, the user may prefer to open fragrance cavity 3 after assembly. For example, although the progression of FIG. 2 shows the opening of the snap seal along precut line 2 (FIG. 2(b)) before assembly of base structure 11 (FIG. 2(c)), the order of these steps can be reversed such that base structure 11 is assembled before the cavities 3, 8 are unsealed, thereby reducing the risk of a spill. Indeed, except for detaching lower-right section 9 prior to assembly of base structure 11, the foregoing steps of the blister pack assembly can be performed in any order.

With the free-standing blister pack assembled, a user can easily move the blister pack from place to place depending on the desire for fragrance. A user can also remove diffuser rods from diffuser cavity 8 and place one or more into fragrance cavity 3 to help the fragrance diffuse in the room.

An exemplary manufacturing process of the free-standing blister pack (specifically the embodiment of FIG. 1) will now be described with reference to FIG. 3. Flat sheets of plastic material 21 are pulled through production equipment to the forming station 22 where the material is molded to form cavities 3 and 8 and flange portions 23 extended from the cavities to form a base layer. In this embodiment, plastic is used to form the cavities, but any suitable material can be used.

Once the base layer is molded to the required shape, the fragrance product (essential oil, scented wax, fragrant power, and the like) 24 is loaded into the filling unit 25 of the equipment in FIG. 3. In this embodiment, the fragrance product 24 is then deposited into fragrance cavity 3 of the blister pack. One or more diffuser rods can then be loaded into diffuser cavity 8.

A cover sheet 26 is then applied to the base layer and pulled through to fusing station 12 where the cover sheet is fused with the base layer, such as by fusing the cover sheet to the flange of the molded material.

The fused unit then passes to the perforation station 13, which creates perforation 6 using knife blades cutting into the fused unit. The final production step in this embodiment is the die cutting station 14. In this station, knife blades are used create the precut line 2, slots 5 and 10, and to form the final shape of the blister packaging 29, such as rounded corners shown in FIG. 1.

In this embodiment, the flanges extending from the cavities of the formed plastic material is coextensive with the cover sheet. However, in other embodiments the flange portions are trimmed prior to application of the sheet, thereby conserving material, reducing weight, and the like. In other embodiments, both the base layer and cover sheet can be trimmed and encased in other packaging such as paper, cardboard, and the like, which would then be perforated and trimmed as described above.

The foregoing description of exemplary embodiments, including examples, is presented only to describe, explain, and illustrate the broad concepts of the disclosed subject matter, and is not intended and should not be construed to limit the scope of the of the present disclosure. Various modifications and improvements may be made by those skilled in the art without departing from the scope. Thus, the disclosed subject matter includes all modifications and improvements that are within the scope of the following claims and their equivalents.

What is claimed is:

1. A free-standing blister pack for sampling a product, comprising:
   a main panel comprising: a main blister cavity with the product disposed therein, a first planar surface extending at least partially outward from the main blister cavity and having a lateral edge and a bottom edge, and a first slot extending substantially inward from the bottom edge; and
   a support panel comprising: a second planar surface detachably connected to the lateral edge of the first planar surface, a second slot extending inward from an edge of the second planar surface, and a support blister cavity containing one or more diffuser rods for use with the product,
   wherein the main panel and the support panel are configured to interlock with each other at the first and second slots when the support panel is detached from the main panel to form a standing structure.

2. The free-standing blister pack for sampling a product of claim 1, wherein the product is a fragrance product.

3. The free-standing blister pack for sampling a product of claim 2, wherein the support panel further comprises a support blister cavity containing one or more diffuser rods or applicators that aid in the diffusion of the fragrance product.

4. The free-standing blister pack for sampling a product of claim 3, wherein the main blister cavity and the support blister cavity have snappable pre-cut sealed openings.

5. The free-standing blister pack for sampling a product of claim 2, wherein the fragrance product is perfume, cosmetic, essential oil, aromatherapy oil, or home fragrance.

6. The free-standing blister pack for sampling a product of claim 1, wherein the standing structure forms a T-shape.

* * * * *